United States Patent
Perez Barrera et al.

(10) Patent No.: US 10,549,653 B2
(45) Date of Patent: Feb. 4, 2020

(54) CABLE MANAGEMENT ASSEMBLY AND METHOD

(71) Applicant: Ford Global Technologies, LLC, Dearborn, MI (US)

(72) Inventors: Oswaldo Perez Barrera, Texcoco (MX); Victor Ariel Perez, Benito Juarez (MX); Alvaro Jimenez Hernandez, Miguel Hidalgo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 25 days.

(21) Appl. No.: 15/805,361

(22) Filed: Nov. 7, 2017

(65) Prior Publication Data

US 2019/0135122 A1   May 9, 2019

(51) Int. Cl.
| | |
|---|---|
| *H02G 3/22* | (2006.01) |
| *B60L 53/60* | (2019.01) |
| *B60L 53/14* | (2019.01) |
| *B60L 53/31* | (2019.01) |
| *F16L 3/01* | (2006.01) |
| *G06K 9/00* | (2006.01) |

(52) U.S. Cl.
CPC ............. *B60L 53/60* (2019.02); *B60L 53/14* (2019.02); *B60L 53/31* (2019.02); *F16L 3/01* (2013.01); *B60L 2230/12* (2013.01); *B60L 2230/16* (2013.01); *B60L 2230/40* (2013.01); *B60L 2270/34* (2013.01); *G06K 9/00006* (2013.01); *G06K 9/00597* (2013.01)

(58) Field of Classification Search
CPC .............. B60L 11/1816; B60L 11/1825; B60L 11/1838; B60L 2230/12; B60L 2230/16; B60L 2230/40; B60L 2270/34; B60L 11/1824; B60L 11/1809; G06K 9/0006; G06K 9/00597; G06K 9/00006; H02G 3/22; H02G 3/30; H02G 3/32
USPC ............ 174/135, 68.1, 68.3, 72 A; 248/68.1, 248/48.1, 49, 74.1, 74.2, 74.3; 320/109, 320/107; 385/134, 135
See application file for complete search history.

(56) References Cited

U.S. PATENT DOCUMENTS

| | | | |
|---|---|---|---|
| 6,431,500 B1 * | 8/2002 | Jacobs | F16L 3/13 248/51 |
| 7,982,131 B2 * | 7/2011 | Fagrenius | H01B 7/06 174/111 |
| 8,485,581 B2 * | 7/2013 | McKnight | B60R 11/00 296/24.34 |
| 9,073,446 B2 | 7/2015 | Hani et al. | |

(Continued)

FOREIGN PATENT DOCUMENTS

| | | |
|---|---|---|
| CN | 202341715 U | 7/2012 |
| CN | 203996026 U | 12/2014 |

(Continued)

*Primary Examiner* — Angel R Estrada
(74) *Attorney, Agent, or Firm* — David B. Kelly; Carlson, Gasakey & Olds, P.C.

(57) ABSTRACT

A cable management assembly configured for selective attachment to an electrified vehicle according to an exemplary aspect of the present disclosure includes, among other things, a cable management structure, and an electromagnet configured to be selectively activated to attach the cable management structure to an exterior of the electrified vehicle. A theft prevention feature and a method are also disclosed.

20 Claims, 3 Drawing Sheets

(56) References Cited

U.S. PATENT DOCUMENTS

| | | | |
|---|---|---|---|
| 9,124,053 B2* | 9/2015 | Metras | H01R 13/60 |
| 9,166,428 B2 | 10/2015 | Ono et al. | |
| 9,327,606 B2 | 5/2016 | Ono et al. | |
| 9,597,970 B2* | 3/2017 | DeBoer, III | B60L 11/1824 |
| 9,722,368 B2* | 8/2017 | Kulas | H01R 24/58 |
| 9,725,006 B2 | 8/2017 | DeBoer, III et al. | |
| 9,884,561 B2* | 2/2018 | Krammer | B60L 11/1811 |
| 9,950,634 B2* | 4/2018 | Bianco | B60L 11/1818 |
| 2007/0144376 A1* | 6/2007 | Jostmeier | H02G 11/006 |
| | | | 101/350.1 |
| 2011/0163141 A1 | 7/2011 | Lucas et al. | |
| 2011/0169447 A1* | 7/2011 | Brown | B60L 3/0069 |
| | | | 320/109 |
| 2011/0175570 A1 | 7/2011 | Lucas | |
| 2014/0305673 A1* | 10/2014 | Kulas | H04R 1/1033 |
| | | | 174/69 |
| 2015/0277491 A1* | 10/2015 | Browning | G06F 1/1632 |
| | | | 248/346.03 |
| 2016/0097220 A1 | 4/2016 | Woodling | |

FOREIGN PATENT DOCUMENTS

| | | |
|---|---|---|
| CN | 204037486 U | 12/2014 |
| CN | 106968524 A | 7/2017 |
| DE | 102011087324 A1 | 5/2013 |
| GB | 2503229 B | 6/2012 |
| JP | 2011050125 A | 3/2011 |
| JP | 2011067060 A | 3/2011 |
| JP | 2014050301 A | 3/2014 |
| JP | 2014150629 A | 8/2014 |
| JP | 2015053811 A | 3/2015 |

\* cited by examiner

CABLE MANAGEMENT ASSEMBLY AND METHOD

TECHNICAL FIELD

This disclosure relates to a cable management assembly and a corresponding method of use. In general, the cable management assembly is configured for selective attachment to a vehicle exterior, and is particularly useful for holding slack in an electrified vehicle charging cable.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Some electrified vehicles charge a battery pack using power from an external power source, such as a grid power source. These electrified vehicles connect to the external power source using electric vehicle supply equipment (EVSE). A cord set, including a power cable (sometimes referred to as a "charging cable" or "cord") and plug, is an example type of EVSE. Power moves from the grid power source through the cord set to the electrified vehicle. The power is used to charge the battery pack.

SUMMARY

A cable management assembly configured for selective attachment to an electrified vehicle according to an exemplary aspect of the present disclosure includes, among other things, a cable management structure, and an electromagnet configured to be selectively activated to attach the cable management structure to an exterior of the electrified vehicle.

In a further non-limiting embodiment of the foregoing cable management assembly, the assembly includes a battery electrically coupled to the electromagnet, and a control module electrically coupled to the battery. The battery is configured to activate the electromagnet in response to an instruction from the control module.

In a further non-limiting embodiment of any of the foregoing cable management assemblies, the control module is configured to deactivate the electromagnet only upon receipt of a recognized input.

In a further non-limiting embodiment of any of the foregoing cable management assemblies, the assembly further includes a user interface electrically coupled to the control module, the control module configured to detect the recognized input from an input to the user interface.

In a further non-limiting embodiment of any of the foregoing cable management assemblies, the user interface is a keypad including a plurality of keys.

In a further non-limiting embodiment of any of the foregoing cable management assemblies, the plurality of keys are alphanumeric keys.

In a further non-limiting embodiment of any of the foregoing cable management assemblies, the user interface is a biometric scanner.

In a further non-limiting embodiment of any of the foregoing cable management assemblies, the biometric scanner is a thumb print scanner.

In a further non-limiting embodiment of any of the foregoing cable management assemblies, the assembly further includes a transceiver electrically coupled to the control module. The control module is configured to detect the recognized input from a signal received by the transceiver.

In a further non-limiting embodiment of any of the foregoing cable management assemblies, the signal received by the transceiver is from a mobile device.

In a further non-limiting embodiment of any of the foregoing cable management assemblies, the transceiver is configured to send a signal to the electrified vehicle indicating that the cable management assembly is still attached to the electrified vehicle. Further, the electrified vehicle is configured to generate a corresponding prompt.

In a further non-limiting embodiment of any of the foregoing cable management assemblies, the cable management structure includes a hook configured to support a charging cable of the electrified vehicle.

A cable management assembly configured for selective attachment to an electrified vehicle according to another aspect of the present disclosure includes, among other things, a cable management structure, an electromagnet selectively activated to attach the cable management structure to an exterior of the electrified vehicle, a battery electrically coupled to the electromagnet, and a control module configured to instruct the battery to deactivate the electromagnet only upon receipt of a recognized input.

In a further non-limiting embodiment of the foregoing cable management assembly, the assembly includes a user interface electrically coupled to the control module. The control module is configured to detect the recognized input from an input to the user interface.

In a further non-limiting embodiment of any of the foregoing cable management assemblies, the user interface is one of (1) a keypad and (2) a biometric scanner.

In a further non-limiting embodiment of any of the foregoing cable management assemblies, the assembly includes a transceiver electrically coupled to the control module. The control module is configured to detect the recognized input from a signal received by the transceiver.

A method according to an exemplary aspect of the present disclosure includes, among other things, attaching a cable management structure to an exterior of an electrified vehicle by activating an electromagnet.

In a further non-limiting embodiment of the foregoing method, the method includes deactivating the electromagnet only upon receipt of a recognized input.

In a further non-limiting embodiment of any of the foregoing methods, the recognized input includes one of (1) an input of a PIN code and (2) an input of biometric information.

In a further non-limiting embodiment of any of the foregoing methods, the recognized input is from a signal from a mobile device.

DETAILED DESCRIPTION

This disclosure relates to a cable management assembly configured for selective attachment to an electrified vehicle. In one embodiment, the assembly includes a cable management structure, such as a hook, and is selectively attached to an exterior of an electrified vehicle by an electromagnet. The electromagnet is configured to be selectively activated to attach the cable management structure to the exterior of the vehicle. In another aspect of this disclosure, the assembly includes a theft prevention feature, which prevents deactivation of the electromagnet unless a recognized input is received. Accordingly, this disclosure holds the slack in a power cable during charging, and in particular elevates the power cable above the ground, which prevents the power cable from being damaged by nearby pedestrians or vehicles. Further, the theft-prevention feature provides a level of comfort, especially when leaving the vehicle unattended while charging for an extended period, by preventing an unauthorized person from detaching the assembly from the vehicle.

Figure 1:
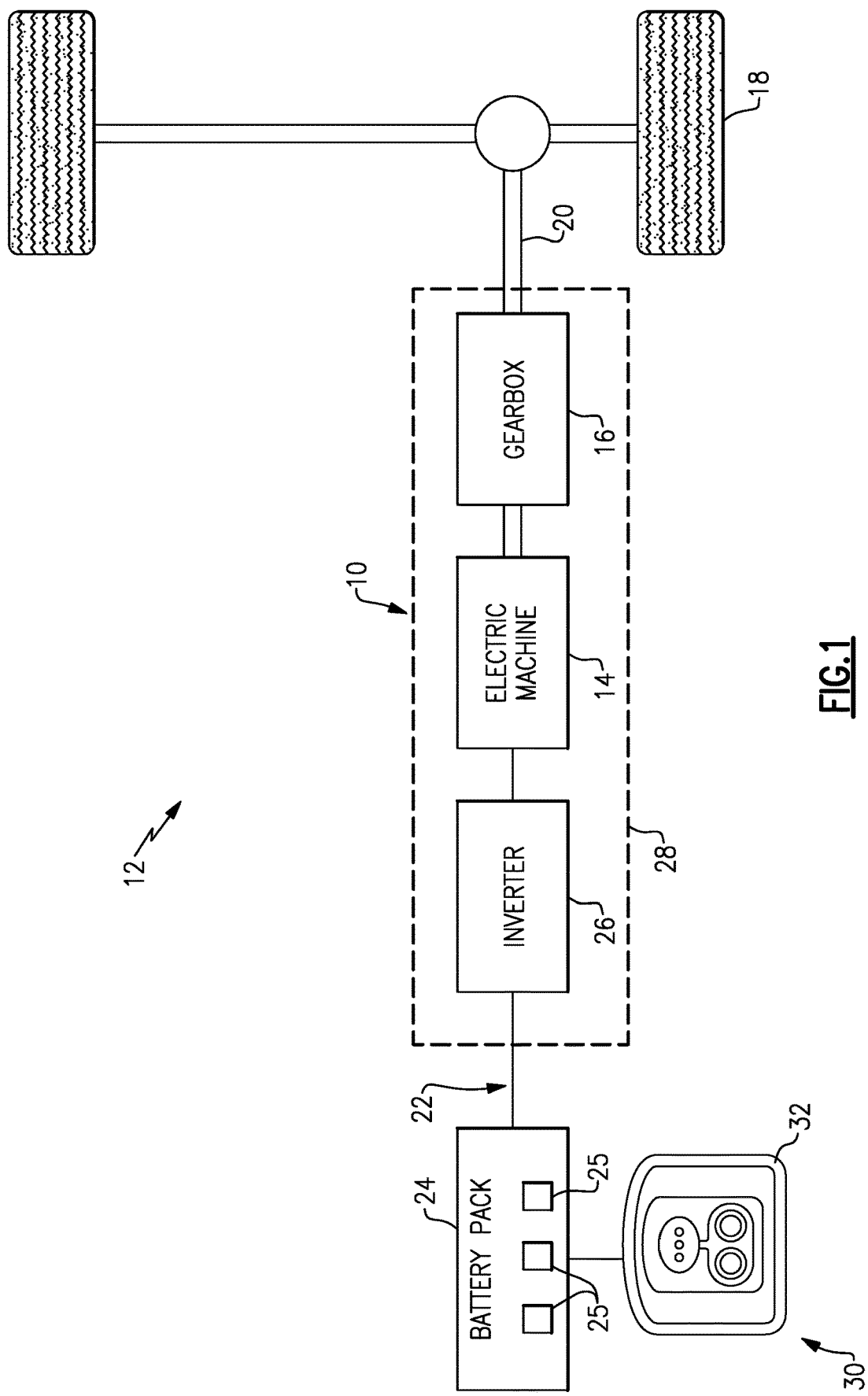
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an energy storage device and, in this example, is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the cells of the battery pack 24. The charging system 30 may be connected to an external power source, such as an electrical grid via a cord set for receiving and distributing power to the cells. In one embodiment, the charging system 30 includes an interface 32, which is a charging port, located on-board the electrified vehicle 12. The interface 32 is adapted to selectively receive power from the external power source, such as from a cord set (i.e., power cable and plug) connected to the external power source, and then distribute the power to the battery pack 24 for charging the cells. One example external power source is an electrified vehicle charging station, such as a publically available electrified vehicle charging station. In another example, the electrified vehicle charging station is private, such as those at homes or businesses.

The charging system 30 may also be equipped with power electronics used to convert AC power received from the external power supply to DC power for charging the cells of the battery pack 24. The charging system 30 may also accommodate one or more conventional voltage sources from the external power supply (e.g., 110 volt, 220 volt, etc.). The powertrain 10 and in FIG. 1 is highly schematic and is not intended to limit this disclosure. Various additional components could alternatively or additionally be employed within the scope of this disclosure.

Figure 2:
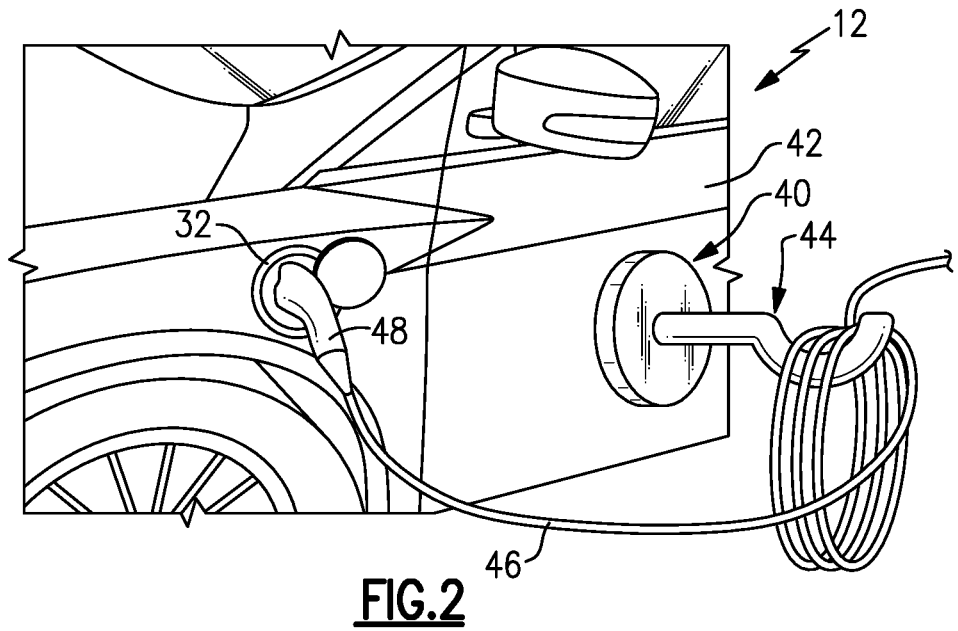
FIG. 2 illustrates a cable management assembly attached to an exterior of an electrified vehicle and supporting a power cable.

FIG. 2 illustrates a cable management assembly 40 attached to an exterior 42 of the electrified vehicle 12. In this example, the exterior 42 of the electrified vehicle 12 is an exterior vehicle body, and in particular is a driver side door. The cable management assembly 40 is configured for selective attachment to other portions of the exterior of the electrified vehicle 12, however.

In general, the cable management assembly 40 includes a cable management structure 44 configured to hold a power cable 46. The power cable 46 is part of a cord set, and is coupled to a plug 48 at one end and an electrified vehicle charging station (not shown) at another end. The plug 48 may have a standard plug configuration corresponding to that of the interface 32, such as an SAE J1772 charge coupler configuration.

The cable management structure 44 includes an arm 50 and a hook 52, in this example. The arm 50 projects from a coupling unit 54, which is configured to selectively attach the cable management assembly 40 to the exterior 42 of the electrified vehicle 12, and is described in more detail below relative to FIGS. 3 and 4. The hook 52 is semi-circular in this example, and, when viewed from a top perspective, is concave. The hook 52 provides a support for the power cable 46. While a semi-circular hook 52 is shown in the figures, this disclosure extends to other structures, including structures of different shapes and configurations, that are configured to hold a power cable. Further, while an arm 50 is shown in this example, the cable management structure 44 could exclude the arm. In one such example, the hook 52 would be directly attached to the coupling unit 54.

As shown in FIG. 2, the power cable 46 can be wrapped about the hook 52, such that the slack in the power cable 46 is maintained above a ground surface while the electrified vehicle 12 is "on plug." "On plug" refers to periods when the plug 48 is coupled to the interface 32, such as when the electrified vehicle 12 is charging.

Figure 3:
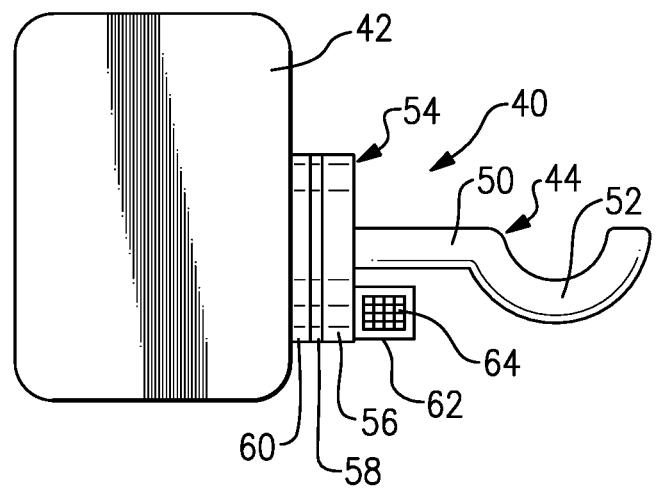
FIG. 3 schematically illustrates one embodiment of the cable management assembly.

The coupling unit 54 is configured to allow selective attachment and detachment of the cable management assembly 40 from the exterior 42 of the electrified vehicle 12. FIG. 3 schematically illustrates an example cable management assembly 40, and schematically illustrates the detail of the coupling unit 54. In this example, the coupling unit 54 includes a control module 56 electrically coupled to a battery 58, which is electrically coupled to an electromagnet 60. The control module 56 is configured to instruct the battery 58 to activate or deactivate the electromagnet 60. Thus, the electromagnet 60 is configured to be selectively activated and deactivated to attach and detach the cable management assembly 40, including the cable management structure 44, from the exterior 42 of the electrified vehicle 12.

As is known of electromagnets, the electromagnet 60 is a type of magnet in which a magnetic field is produced by an electric current. The electric current, in this example, is selectively directed to the electromagnet 60 by the battery 58, in response to instructions from the control module 56. Directing current through the electromagnet 60 activates the electromagnet 60, which causes the electromagnet 60 to generate a magnetic field sufficient to attach the cable management assembly 40 to the exterior 42, which is made of a metallic material. The magnetic field generated by the electromagnet 60 is sufficient to allow the cable management assembly 40 to support the power cable 46 without moving or falling. When deactivated, the battery 58 does not direct current through the electromagnet, and thus the electromagnet 60 does not generate a magnetic field, which allows a user to remove the cable management assembly 40 from the electrified vehicle 12.

It should be understood that the control module 56 may be programmed with executable instructions for interfacing with and operating the various components of the cable management assembly 40. The control module 56 additionally includes a processing unit and non-transitory memory for executing the various control strategies and modes.

It should also be understood that a benefit of the cable management assembly 40 is its portability. To this end, the electromagnet 60 is powered by a battery 58, and not a wired connection. The battery 58 may be selectively charged by a user when its state of charge (SOC) is low, and in particular may be selectively charged inside the electrified vehicle 12. The battery 58 may also provide an estimated remaining charge and/or a "low charge" prompt to the user, as appropriate. Use of the battery 58 allows the user to selectively attach the cable management assembly 40 at any desired location on the exterior 42 of the electrified vehicle 12, which is beneficial because the power cable 46 may be located at various locations (e.g., the front, rear, or sides of the vehicle) relative to the vehicle depending on the charging location configuration. When a charging operation is complete, the cable management assembly 40 can be detached from the exterior 42 of the electrified vehicle 12 and conveniently stored in the electrified vehicle 12, such as in the trunk.

The cable management assembly 40 may be attached to the exterior 42 of the electrified vehicle 12 for extended periods, and left unattended during those periods. In order to prevent theft of the cable management assembly 40, the control module 56 is configured to deactivate the electromagnet 60 only upon receipt of a recognized input. In one example of this disclosure, the control module 56 is electrically coupled to a user interface 62, which allows a user to input information, such as a PIN code, password, or biometric information. The control module 56 is programmed to recognize that information, and to allow deactivation of the electromagnet 60 upon receipt of a recognized input.

In FIG. 3, the user interface 62 is shown as a keypad 64 including a plurality of keys, such as alphanumeric keys. Alternatively, the user interface 62 may include a biometric scanner, such as a thumb print or retina scanner. While certain examples have been discussed above, this disclosure is not limited to any particular user interface.

It should be understood that various components of the cable management assembly 40 have been shown schematically in the figures. In particular, the control module 56, battery 58, electromagnet 60, and user interface 62 have been illustrated schematically for purposes of illustration only. Further, while the control module 56, battery 58, electromagnet 60, and user interface 62 have been illustrated separately in the figures, these components could be integrated into a single component in some examples.

Figure 4:
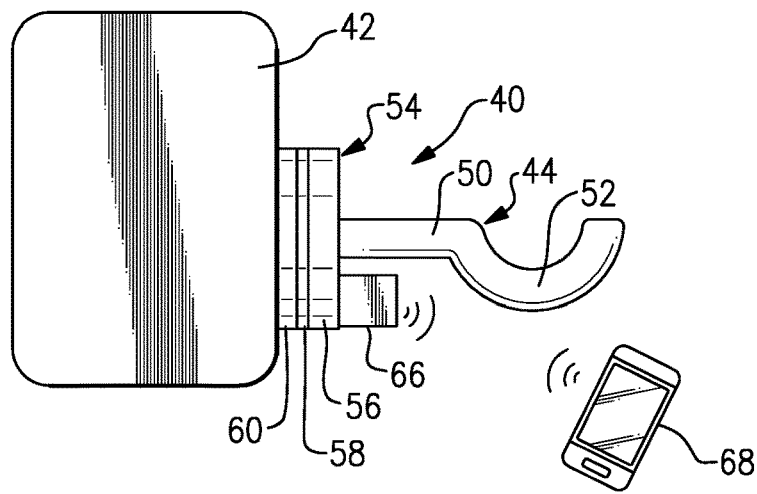
FIG. 4 schematically illustrates another embodiment of the cable management assembly.

FIG. 4 schematically illustrates another example cable management assembly 40. The cable management assembly 40 of FIG. 4 is similar to that of FIG. 3, with the exception of the user interface 62 being replaced with a transceiver 66, which is configured to send and receive wireless signals. The transceiver 66 is shown schematically in FIG. 4, and could be integrated into other components of the coupling unit 54. In FIG. 4, the control module 56 is electrically coupled to the transceiver 66, and the control module 56 is configured to detect a recognized input from a signal received by the transceiver 66. In one example, the transceiver 66 is configured to receive a wireless signal, such as a Bluetooth® signal, from a mobile device 68 of a user. The control module 56 is configured to recognize the signal from the user's mobile device 68 as a recognized input, and allow deactivation of the electromagnet 60 upon receipt of this input.

The mobile device 68 may be a mobile phone, but this disclosure is not limited to any particular type of mobile device. The mobile device 68 may be any other type of mobile electronic device, however, including a tablet, smart watch, etc. In another example, the mobile device 68 may be the ignition key fob used to start the electrified vehicle 12.

In order to prevent a user from driving while the cable management assembly 40 is still attached to the exterior 42 of the electrified vehicle 12, the transceiver 66 is also configured to send a signal to the electrified vehicle 12 indicating that the cable management assembly 40 is attached to the exterior 42. The electrified vehicle 12, in turn, is configured to present a prompt to the user indicating that the cable management assembly 40 is still attached, or to prevent the electrified vehicle 12 from driving altogether. In another example, the control module 56 is configured to automatically deactivate the electromagnet 60 when the electrified vehicle 12 starts after a charging operation. While shown separately in the figures, it should be understood that the coupling unit 54 could include both a user interface 62 and a transceiver 66, thereby allowing the user to take advantage of the functionality of both arrangements.

Figure 5:
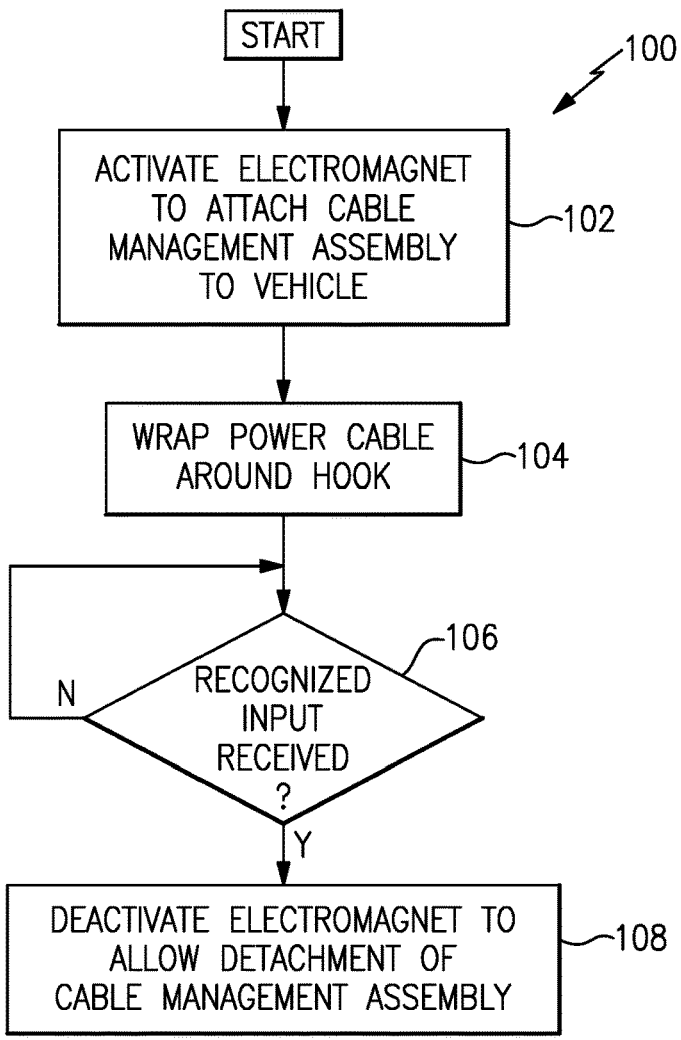
FIG. 5 is a flow chart representative of a method according to this disclosure.

FIG. 5 is a flow chart representative of an example method 100 for using the cable management assembly 40. In the method 100, a user attaches the cable management assembly 40 to the electrified vehicle 12 by placing the coupling unit 54 against the exterior 42 of the electrified vehicle 12, and activating the electromagnet 60, at 102. The electromagnet 60 may be activated automatically when the electromagnet 60 is pressed against a metallic surface, such as the exterior 42, or may be activated manually by the user providing an appropriate input via the user interface 62 or sending a signal via their mobile device 68, as examples.

Next, at 104, the user places the power cable 46 on the hook 52 to support the power cable 46 above a ground surface during charging. This prevents nearby vehicles or pedestrians from crushing the power cable 46, which in turn prevents damage to, and prolongs the life of, the power cable 46.

When attempting to detach the cable management assembly 40, the control module 56 is configured to only deactivate the electromagnet 60 upon receipt of a recognized input, at 106. Again, the recognized input may take the form of a PIN code, biometric information, or a wireless signal, as examples. If the recognized input is received, at 108, the control module 56 instructs the battery 58 to deactivate the electromagnet 60, which allows the user to detach the cable management assembly 40 from the exterior 42.

Although a specific component relationship is illustrated in the figures of this disclosure, the illustrations are not intended to limit this disclosure. In other words, the placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about" and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cable management assembly configured for selective attachment to an electrified vehicle, comprising:
   a cable management structure; and
   an electromagnet configured to be selectively activated to attach the cable management structure to an exterior of the electrified vehicle.

2. The cable management assembly as recited in claim 1, further comprising:
   a battery electrically coupled to the electromagnet; and
   a control module electrically coupled to the battery, the battery configured to activate the electromagnet in response to an instruction from the control module.

3. The cable management assembly as recited in claim 2, wherein the control module is configured to deactivate the electromagnet only upon receipt of a recognized input.

4. The cable management assembly as recited in claim 3, further comprising:
   a user interface electrically coupled to the control module, the control module configured to detect the recognized input from an input to the user interface.

5. The cable management assembly as recited in claim 4, wherein the user interface is a keypad including a plurality of keys.

6. The cable management assembly as recited in claim 5, wherein the plurality of keys are alphanumeric keys.

7. The cable management assembly as recited in claim 4, wherein the user interface is a biometric scanner.

8. The cable management assembly as recited in claim 7, wherein the biometric scanner is a thumb print scanner.

9. The cable management assembly as recited in claim 3, further comprising:
   a transceiver electrically coupled to the control module, the control module configured to detect the recognized input from a signal received by the transceiver.

10. The cable management assembly as recited in claim 9, wherein the signal received by the transceiver is from a mobile device.

11. The cable management assembly as recited in claim 9, wherein the transceiver is configured to send a signal to the electrified vehicle indicating that the cable management assembly is still attached to the electrified vehicle, and wherein the electrified vehicle is configured to generate a corresponding prompt.

12. The cable management assembly as recited in claim 1, wherein the cable management structure includes a hook configured to support a charging cable of the electrified vehicle.

13. A cable management assembly configured for selective attachment to an electrified vehicle, comprising:
    a cable management structure;
    an electromagnet selectively activated to attach the cable management structure to an exterior of the electrified vehicle;
    a battery electrically coupled to the electromagnet; and
    a control module configured to instruct the battery to deactivate the electromagnet only upon receipt of a recognized input.

14. The cable management assembly as recited in claim 13, further comprising:
    a user interface electrically coupled to the control module, the control module configured to detect the recognized input from an input to the user interface.

15. The cable management assembly as recited in claim 14, wherein the user interface is one of (1) a keypad and (2) a biometric scanner.

16. The cable management assembly as recited in claim 13, further comprising:
    a transceiver electrically coupled to the control module, the control module configured to detect the recognized input from a signal received by the transceiver.

17. A method, comprising:
    attaching a cable management structure to an exterior of an electrified vehicle by activating an electromagnet.

18. The method as recited in claim 17, further comprising:
    deactivating the electromagnet only upon receipt of a recognized input.

19. The method as recited in claim 18, wherein the recognized input includes one of (1) an input of a PIN code and (2) an input of biometric information.

20. The method as recited in claim 18, wherein the recognized input is from a signal from a mobile device.

* * * * *